INVENTOR
JOHN S. SPRAGUE
BY
ATTORNEYS

United States Patent Office 3,282,366
Patented Nov. 1, 1966

3,282,366
FOUR-WHEEL-DRIVE AND STEERED VEHICLE WITH SHORT WHEEL BASE FOR OFF-THE-ROAD SERVICE
John S. Sprague, San Leandro, Calif.
(Rte. 1, Box 334, Oroville, Calif.)
Filed July 8, 1963, Ser. No. 293,366
3 Claims. (Cl. 180—45)

This invention relates to motor vehicles in general, and is more particularly directed to a compact, off-road, motor vehicle which employs a unique power transmission arrangement, a four wheel drive mechanism and a four wheel steering system to the ends of providing an extremely short wheel base and turning radius which are particularly conducive to off-road service.

Conventional motor vehicles are usually designed for use on paved roads and are totally unsuited to travel over rough and rugged terrain. For such off-road travel, which is desirable in hunting, prospecting, and the like, as well as in numerous military applications, conventional motor vehicles are too bulky and unmaneuverable to be practical. The wheel base of a conventional vehicle is relatively long such that in off-road terrain the underside of the vehicle is quite susceptible to dragging or being "hung-up" on ridges or the like. In addition, by virtue of the relatively long wheel base and two-wheel steering employed in a conventional vehicle, the turning radius thereof is not sufficiently short to permit easy maneuverability about trees and other obstacles. Accordingly, various vehicles such as "jeeps" and the like have been designed specifically for off-road service. These off-road vehicles are relatively compact and usually equipped with a four wheel power drive system, however, they are not adaptable to a four wheel steering system. The wheel base of such a vehicle is not as short as might be desirable inasmuch as the space requirements of the transfer gear cases included in the power transmission system between the engine and wheels impose limitations on minimization of the wheel base. The turning radius of the conventional off-road vehicle is as a result much longer than practical.

Accordingly, it is an object of the present invention to provide an improved off-road vehicle which has a much shorter wheel base and turning radius than previous vehicles of this type.

Another, and particularly important, object of the invention is to provide a motor vehicle having a compact four wheel drive power transmission system wherein no transfer gear case such as the usual transmission housing is required between the engine and wheels.

Still another object of the invention is the provision of a motor vehicle of the class described which includes a four wheel steering system.

It is yet another object of the invention to provide a vehicle of the class described which may be readily made small enough to easily fit the bed of a standard pickup truck.

A further object of the invention is the provision of a vehicle of the class described which may be manufactured at an extremely low cost.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
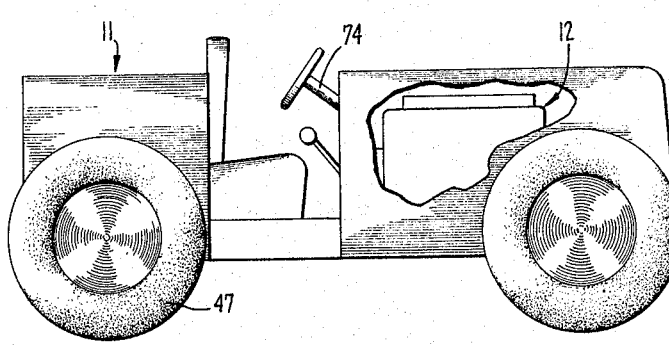
FIGURE 1 is an elevation view of a compact off-road vehicle in accordance with the invention.

Referring now to FIGURE 1, a compact off-road vehicle in accordance with the invention is designated at 11, and this vehicle includes an engine assembly 12 mounted adjacent the front wheels 13, 14. It is particularly important to note that the assembly 12 is of a type which includes an engine, clutch, gearbox, and drive axle or output shaft in a single unit. Engine assemblies of this type which are suitable to the ends of the present invention include those designated "ADO 15 and 16" as manufactured by British Motor Car Corp. More particularly, such assemblies are shown and described in shop manual AKD–3294 published by said corporation prior to the filing of this application. Briefly, the referenced engine assemblies include a cylinder block 16 with pistons 17 mounted for reciprocation therein and connected to a crank shaft 18 journalled within a crank case 19, subjacent the block, in a conventional manner. To one end of the crank shaft there is fixedly attached a flywheel 21 which is disposed within a bell housing 22 at the corresponding end of the block and crank case. In addition, a power return sleeve shaft 23 is concentrically rotatably mounted upon the crank shaft and traverses the wall between the bell housing and the block and crank case. One end of the sleeve shaft is closely adjacent the flywheel, while the other end of the shaft is disposed in the crank case with a transfer gear 24 keyed, or otherwise rigidly coaxially secured thereto. The sleeve shaft may be selectively coupled to or decoupled from the crank shaft as by means of a clutch 26 having one clutch element 27 carried by the flywheel 21 and another clutch element 28 carried by the adjacent end of the sleeve shaft 23. When the clutch elements 27, 28 are engaged, the sleeve shaft is thus coupled to the crank shaft and rotates therewith to drive transfer gear 24. When the clutch elements 27, 28 are disengaged, the sleeve shaft is decoupled from the crank shaft and hence rotation of the gear ceases.

The engine assembly 12 further includes a transmission 29 which is disposed within the crank case 19, and is accordingly an integral component of the engine assembly. The transmission has a shaft 31 journalled within the crank case, and a gear 32 secured to the transmission shaft is in engagement with gear 24. Thus the transmission shaft rotates with the sleeve shaft 23 when the clutch elements 27, 28 are engaged. The transmission is further provided with a plurality of gears 33 secured to the shaft 31 which may be selectively coupled in driving relation to a ring gear 34 to facilitate variable ratio driving thereto. The ring gear serves to couple the variable speed output of the transmission to a differential 36 disposed within a housing 37 which projects laterally from the crank case. More particularly, a ring gear 38 within housing 37 couples ring gear 34 in driving relation to differential 36 whereby the differential is driven in accordance with the variable speed output of the transmission. Output shafts 39, 41 including universal joints 42, 43 are coupled to the differential and extend through opposite sides of the housing 37 so as to be externally accessible for coupling to vehicle wheels or the like. It will thus be appreciated that the engine assembly 12 contemplated for employment in the off-road vehicle of the present invention includes engine, clutch transmission, and output shaft as an integral unit.

Commonly engine assemblies of the type described above are mounted in a vehicle with the output shafts transversely disposed and directly connected to one set of wheels of the vehicle. However, this facilitates driving of only two wheels, whereas in an off-road vehicle four wheel drive is virtually required. In accordance with a particularly salient aspect of the present invention the engine assembly 12 is incorporated in a four wheel drive power transmission system in such a manner that no transfer gear case (viz. transmission) is required between the engine assembly and wheels. More particularly, in the power transmission system employed in the vehicle of the present invention, the transfer gear case, being integrally provided with the engine assembly 12, is positioned in a forward location of the vehicle, rather than in the customary medial regions thereof. As a result the normal space requirements of the gear case in a region between the front and rear wheels is eliminated and the vehicle 11 may be designed to have an extremely short wheel base.

Figure 2:
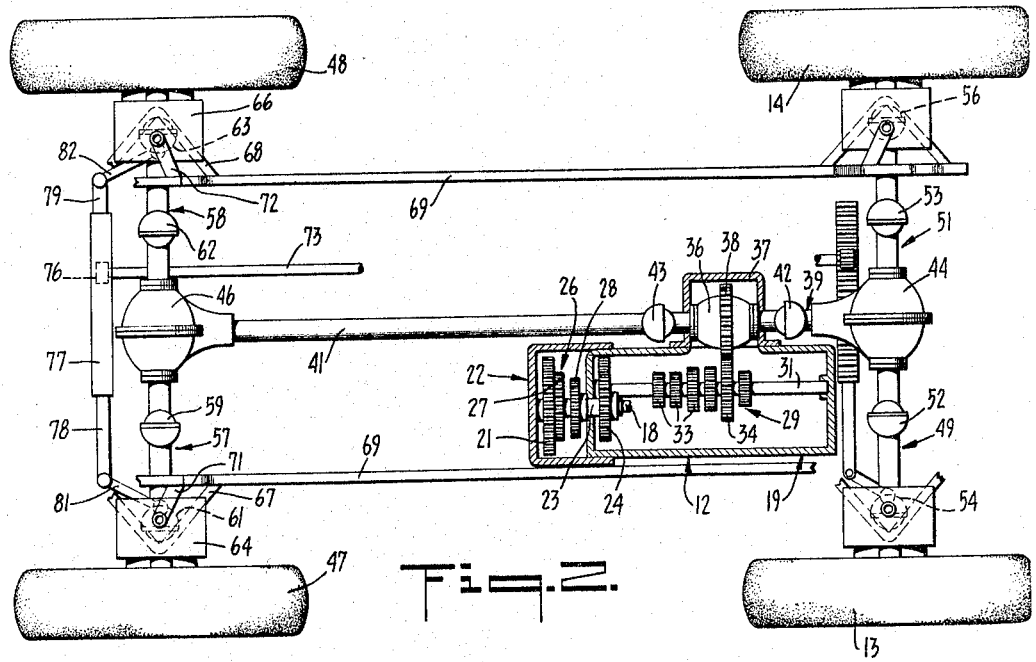
FIGURE 2 is a plan view with portions broken away of the unique power transmission system employed in the vehicle, and also depicting a four wheel steering system employed in the vehicle.
Figure 3:
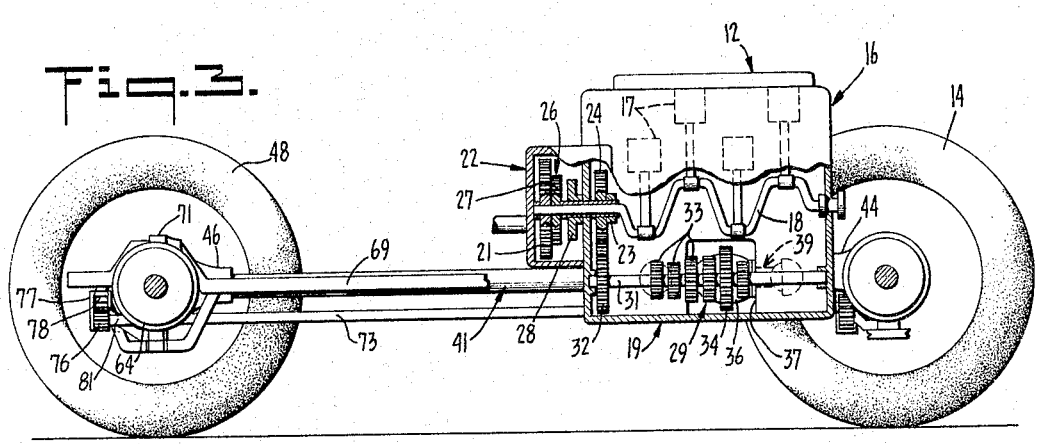
FIGURE 3 is a longitudinal vertical section through the engine assembly employed in the system of FIGURE 2.

The power transmission system is depicted in FIGURES 2 and 3, and it is to be noted that the engine assembly 12 as incorporated therein is oriented with its output shafts 39, 41 extending longitudinally of the vehicle, rather than in the conventional transverse orientation. The ends of the shafts 39 and 41 are coupled to differentials 44 and 46 which are respectively coupled in driving relation to wheels 13, 14 and 47, 48. More particularly, differential 44 is preferably coupled to swing axles 49, 51 in turn coupled to wheels 13, 14. In this regard the axles 49, 51 best include universal joints 52, 53 in their connections to differential 44 and universal joints 54, 56 in their connections to the wheels 13, 14. Similarly swing axles 57, 58 respectively including universal joints 59, 61 and 62, 63 are best employed to couple differential 46 to wheels 47, 48. The swing axles facilitate continuous driving of the wheels for the various orientations the wheels may assume relative to the differentials in cornering, bouncing up and down, etc. It will be appreciated that in the power transmission system just described, no transfer case is included between engine assembly 12 and differentials 44, 46 such that the spacing therebetween may be made extremely small commensurate with a very short wheel base.

The versatility of the vehicle 11 may be enhanced by the incorporation of a four wheel steering system therein. In such a system the front and rear wheels are turned in opposite directions to provide a very sharp turning radius. The steering system may be incorporated in the vehicle in conjunction with the power transmission system in the manner depicted in FIGURES 2 and 3. The hubs 64, 66 associated with, for example, the rear wheels 47, 48 are pivotally mounted at their lower ends upon A-frames 67, 68 secured to the vehicle chassis 69 in the usual manner. Radius rods 71, 72 likewise project from the chassis into pivotal connection with the upper portions of the hubs. The universal joints 61, 63 are mounted within the hubs and enable the axles 57, 58 to drive the wheels even when the hubs are pivoted relative to the A-frames and radius rods. The hubs are coupled to a steering shaft 73 which extends longitudinally of the vehicle chassis and is coupled to the steering wheel 74 of the vehicle in the usual manner. When the steering wheel is turned, the shaft 73 is turned, and through an appropriate linkage coupled to the hubs pivots same in the desired direction. Although various linkages may be employed, same is herein preferably provided as being of the rack and pinion type. More particularly, a pinion 76 is secured to shaft 73 and engages a rack 77 which is mounted for movement on the chassis. Tow rods 78, 79 secured to opposite ends of the rack are pivotally connected at their free ends to two arms 81, 82 which project from the hubs 64, 66. Thus, as the rack is translated in response to rotation of the shaft and pinion, the hubs are pivoted in corresponding directions. As shown in the drawing a similar rack and pinion linkage is coupled to the steering drive shaft 73 and to the hubs associated with the front wheels 13, 14 in a corresponding manner with the exception that the rack is in an inverted position to effect pivoting of the front wheel hubs in the opposite direction from the rear wheel hubs.

What is claimed is:

1. In a vehicle including front and rear wheels supported by a chassis, a four wheel drive power transmission system comprising an engine assembly mounted upon said chassis in the forward portions thereof; said assembly including an engine block, pistons mounted for reciprocation within said block, a crank case subjacent said block, a crank shaft journalled within said crank case and connected to said pistons, a transmission shaft journalled within said crank case in parallel relation to said crank shaft, transmission gearing coupled to said transmission shaft and including an output gear, a power return sleeve shaft concentrically rotatably disposed upon an end of said crank shaft, a bell housing carried at an end of said block and crank case and receiving said end of said crank shaft and said sleeve shaft, a fly wheel disposed within said bell housing and secured to said end of said crank shaft, a clutch disposed within said bell housing for selectively coupling said sleeve shaft to and decoupling said sleeve shaft from said fly wheel, a drive gear disposed in said crank case and secured to said sleeve shaft, an input gear secured to said transmission shaft and engaging said drive gear, a differential mounted laterally of said crank case, a ring gear coupling said output gear to said differential, and a pair of output shafts including universal joints connected to said differential and extending in opposite longitudinal directions therefrom; and second and third differentials mounted upon said chassis and respectively coupling the free ends of said output shafts in driving relation to said front and rear wheels.

2. In a vehicle including front and rear wheels supported by a chassis, a four wheel drive power transmission system comprising an engine assembly mounted upon said chassis; said assembly including in an integral unit an engine having a crankhaft, a transfer gear, a change speed gear transmission having its transmission shaft and the axes of its variable speed change gears respectively parallel to and laterally adjacent said crankshaft with the ends of said transmission shaft intermediate the ends of said crankshaft, gearing including said transfer gear and a clutch on said crankshaft and said transmission shaft for selectively coupling said crankshaft to said transmission shaft and a differential coupled to the variable speed output of said transmission and mounted laterally of said tranmission shaft and the engine crankshaft and intermediate the ends of said transmission shaft; a pair of output shafts connected to said differential and extending therefrom in opposite directions longitudinally of said chassis; and second and third differentials mounted upon said chassis and respectively coupling the free ends of said output shafts in driving relation to said front and rear wheels whereby said vehicle can be provided with a short wheel base conducive to off-road travel and maneuverability.

3. A short wheel based, four wheel drive vehicle according to claim 2 further including steering means carried by said chassis and coupled to said wheels for turning the front wheels and rear wheels in opposite directions.

References Cited by the Examiner

UNITED STATES PATENTS

| | | | |
|---|---|---|---|
| 940,145 | 11/1910 | Gray | 180—46 |
| 1,093,131 | 4/1914 | Hays | 180—45 X |
| 1,211,531 | 1/1917 | Blomstrom | 180—44 X |
| 1,635,236 | 7/1927 | Tolson | 180—45 |
| 2,420,581 | 5/1947 | Bacon. | |

FOREIGN PATENTS

| | | |
|---|---|---|
| 585,264 | 9/1933 | Germany. |
| 1,016,243 | 11/1952 | France. |

A. HARRY LEVY, *Primary Examiner.*